Sept. 29, 1942.   O. O. RIESER   2,297,326

VALVED NONOVERFILL STRUCTURE

Filed Nov. 16, 1939

INVENTOR.
OLIVER O. RIESER.
BY Allen & Allen
ATTORNEYS.

Patented Sept. 29, 1942

2,297,326

UNITED STATES PATENT OFFICE 2,297,326

VALVED NONOVERFILL STRUCTURE

Oliver O. Rieser, Oak Park, Ill., assignor to The Richardson Company, Lockland, Ohio, a corporation of Ohio Application November 16, 1939, Serial No. 304,772

9 Claims. (Cl. 136—178)

My invention relates to structures for electric storage batteries embodying electrolyte control means of the type wherein there is a tubular extension from the filling opening terminating downwardly at a desired maximum electrolyte level, and wherein a valve controls the venting of the gas collection space above the electrolyte level so that, during filling, the valve being closed, the water or electrolyte will rise rapidly in the tubular extension as soon as the electrolyte level reaches the maximum, thus giving an over-fill signal and preventing actual over-filling, while, when the filler cap is in place, the valve is opened to provide adequate venting.

An object of my invention is the provision of a structure in which the valve mechanism is positively, mechanically operated by the filler cap.

Another object of the invention is to secure such operation in a weight-controlled valve structure so that the disadvantages of resilient means are avoided.

Another object of my invention is to provide a structure in which the valve member is bodily lifted from the valve seat, and in which accurate conformation of parts is unnecessary excepting at the valve seat.

Another object of the invention is to provide a structure in which the manufacture of the cell cover is not complicated, or rendered more expensive, and a structure in which the parts of the overfill mechanism are essentially super-added parts which may be employed or not according as the non-overfill feature is desired or not, without in any way complicating either the manufacture or use of the storage battery.

Another object of the invention is to provide a structure in which all of the moving operating parts are removable and replaceable as desired without disassembly of the battery.

Another object of the invention is to provide a structure in which provision may be made for establishing desired different maximum electrolyte heights through the use of interchangeable parts, all without any alteration in the form or manufacture of the cell cover itself.

These and other objects of my invention, which will be set forth hereinafter or will be apparent to one skilled in the art upon reading this specification, I accomplish by that certain construction and arrangement of parts of which I shall now describe exemplary embodiments. Reference is made to the drawing wherein.

Briefly, in the practice of my invention I employ a flanged sleeve which constitutes the tubular extension of the filler opening. The sleeve extends through the central hole of the filler well, with the flange resting on the shoulder of the filler well bottom and acting as a valve, the said shoulder being the valve seat and having one or more gas-vent passageways. The filler cap has means for engaging the sleeve and moving it bodily upward; and for retaining the filler cap and sleeve a stop is provided in the filler well limiting the movement of the sleeve.

Figure 1:
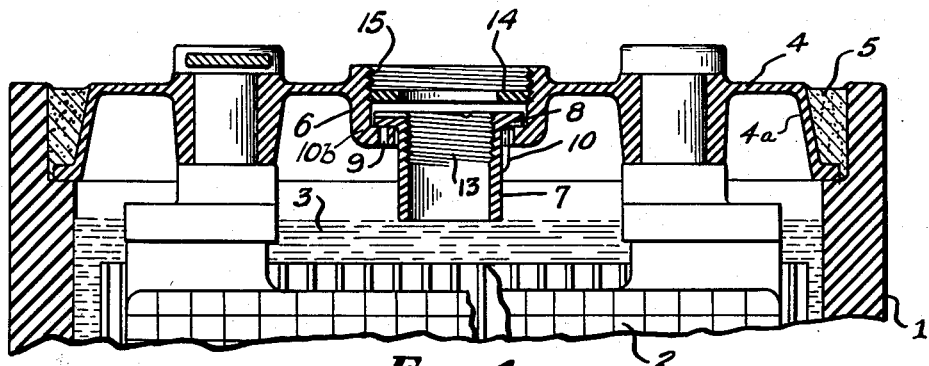
Figure 1 is a partial sectional view through a cell of a storage battery, showing the cell cover and the elements of one form of my invention.

In Figure 1, 1 indicates the walls of a storage battery case defining a cell, which contains a plate assembly 2 and electrolyte 3. The cell has a cover 4 of ordinary form, with the usual skirt 4a permitting the use of sealing compound 5 in affixing the cover to the battery case, and the usual perforations for the lugs of the plate assembly. My invention is not confined, however, to this form of cover, but is applicable to any of those suggested for storage battery use, as will be apparent to the skilled worker in the art.

The cover has a filler opening, the walls of which define a well 6. The bottom of the well is cut away, preferably centrally, for filling purposes; but is not wholly cut away so that a shoulder 10b is left. I provide a sleeve 7 of tubular form surmounted by a flange 8. In use the flange rests upon the shoulder of the bottom of the well, while the tubular sleeve portion extends downwardly to the desired maximum electrolyte level. It is an advantage of my structure that sleeve members of different lengths may be provided as stock items permitting selection of a desired maximum electrolyte level with the same cell cover and storage battery construction.

The sleeve may be made of any suitable material including hard rubber and other moulding compositions resistant to the storage battery electrolyte, or it may be made of heavier materials such as metals similarly resistant, of which antimonial lead is a good example. With the sleeve member in the position shown in Figure 1, it will be evident that as the cell is filled through the sleeve, as soon as the electrolyte reaches the bottom of the sleeve it will rise rapidly therein, thus giving a signal that the filling operation is complete. Any rise of the electrolyte within the sleeve operates to give this signal, but if the weight of the sleeve member is sufficient to counterbalance a column of electrolyte for the full length of the sleeve, it will be clear that the cell cannot be overfilled since the addition of more electrolyte or water will simply fill the filling opening. For gas venting purposes I provide one or more perforations 9 in the bottom of the well. These perforations are closed, when the filler cap is removed, by the flange 8 on the sleeve 7, as shown in Figure 1. If, however, the sleeve is raised, gas can escape through these perforations and around the outside of the flange, which has a relatively loose fit in the well. To prevent the sleeve from turning in the well, I prefer to provide a ridge or projection 10 on the outside of the sleeve at one point, which ridge or projection operates in a corresponding groove in the edge of the bottom of the well. This groove may itself be made large enough to act as a gas venting passageway, and by the term passageway I desire to include such a structure as well as perforations in the well bottom.

Figures 2, 3:
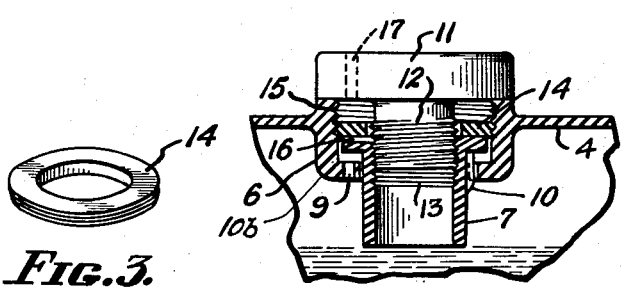
Figure 2 is a partial sectional view of the same structure showing the relationship of the parts when the filler cap is in place.
Figure 3 is a perspective view of a threaded stop member.
Figure 4:
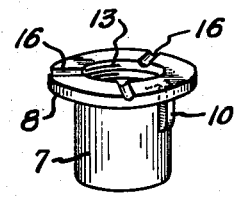
Figure 4 is a perspective view of a sleeve.

I provide a filler cap 11 having the usual hand-grip portion and a central downwardly depending threaded extension 12. The threads on this extension cooperate with threads 13 on the interior of the sleeve 7 so that as the filler cap is screwed in place the sleeve is positively raised as shown in Figure 2. In order to limit the movement of the sleeve I provide a stop ring 14. It is convenient to thread the walls of the filler well as at 15, and correspondingly thread the periphery of the stop ring so that the stop ring may be threaded into the well. When the filler cap is put in position the engagement of the threads therein with the threads 13 of the sleeve will raise the sleeve until it strikes the stop ring 14. By this arrangement the filler cap is held in place and may be screwed down tightly against the top of the walls of the filler opening. A sealing gasket may be provided on the filler cap if desired.

It will be understood that the central perforation in the stop ring is sufficiently larger than the threaded extension 12 to permit passage of gas between the stop and the extension. In order to get the gas past the flange, when the parts are in the position shown in Figure 2, I may provide the upper surface of the flange with one or more gas passage grooves 16. Also the filler cap will be vented as by one or more perforations 17.

Figure 5:
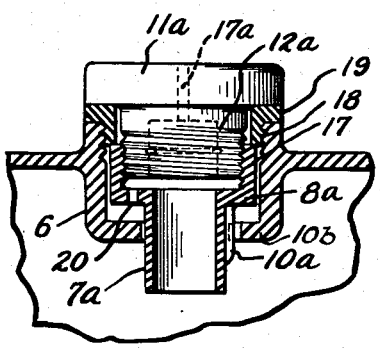
Figure 5 is a partial sectional view of a modified form of the structure.

In Fig. 5 I have shown a modified structure wherein the filler well is the same as before, but the sleeve 7a with its flange 8a has an upward tubular extension 17. The same type of stop ring as hereinabove described may be employed, if desired. I have shown in Figure 5 a modified form of stop ring having a threaded portion 18 and an upper flange 19 overlying the top of the filler opening. The stop is thus in the form of a threaded nipple which may be screwed down tight in the filler opening and left in place. The embodiment of Figure 5 differs from the structure first described in that for gas venting purposes I provide one or more perforations 20 in the flange 8a, so that when the filler cap is in place, gas can pass through these perforations into the interior of the upward extension 17 of the sleeve. It is only necessary that the perforation or perforations 20 be out of registry with any perforations in the bottom of the well, so that when the filler cap is removed all gas vent passageways will be sealed off. This relationship, however, is maintained by the ridge 10a on the sleeve and the corresponding groove in the bottom of the well, which prevents rotation of the sleeve. In the structure of Figure 5 the threaded extension 12a of the filler cap 11a is larger and hollow within and may be centrally vented as at 17a. Further it may be provided with the conventional splash washer (not shown) if desired.

Modifications may be made in my invention without departing from the spirit thereof.

Having thus described my invention, what I claim as new and desire to secure by Letters Patent is:

1. A storage battery cell cover having a filler opening with walls defining a well open to the interior of the cell and presenting an internal shoulder, a valve member having a sleeve which is a tubular portion extending downwardly from said shoulder and a flange resting on said shoulder, means permitting the passage of gas through the said shoulder under said flange, said flange adapted to close said means, a vented filler cap having means for engaging and lifting said sleeve, whereby to permit gas passage, and a stop for limiting the lifting motion of said sleeve.

2. A storage battery cell cover having a filler opening with walls defining a well open to the interior of the cell and presenting an internal shoulder, a valve member having a sleeve which is a tubular portion extending downwardly from said shoulder and a flange resting on said shoulder, means permitting the passage of gas through the said shoulder under said flange, said flange adapted to close said means, a vented filler cap having means for engaging and lifting said sleeve, whereby to permit gas passage, and a stop for limiting the lifting motion of said sleeve, said means for engaging and lifting said sleeve comprising a threaded extension on said filler cap and cooperating threads on said sleeve, the engagement of said sleeve and said shoulder being such as to inhibit rotation of said sleeve therein.

3. A storage battery cell cover having a filler opening with walls defining a well open to the interior of the cell and presenting an internal shoulder, a valve member having a sleeve which is a tubular portion extending downwardly from said shoulder and a flange resting on said shoulder, means permitting the passage of gas through the said shoulder under said flange, said flange adapted to close said means, a rented filler cap having means for engaging and lifting said sleeve, whereby to permit gas passage, and a stop for limiting the lifting motion of said sleeve, said means for engaging and lifting said sleeve comprising a threaded extension on said filler cap and cooperating threads on said sleeve, the engagement of said sleeve and said shoulder being such as to inhibit rotation of said sleeve therein, said stop means comprising a ring having a perforation to accept said filler cap extension, the interior walls of said filler opening being threaded, and said ring having threaded engagement therein.

4. A storage battery cell cover having a filler opening with walls defining a well open to the interior of the cell and presenting an internal shoulder, a valve member having a sleeve which is a tubular portion extending downwardly from said shoulder and a flange resting on said shoulder, means permitting the passage of gas through the said shoulder under said flange, said flange adapted to close said means, a filler cap having means for engaging and lifting said sleeve, whereby to permit gas passage, and a stop for limiting the lifting motion of said sleeve, said means for engaging and lifting said sleeve comprising a threaded extension on said filler cap and cooperating threads on said sleeve, the engagement of said sleeve and said shoulder being such as to inhibit rotation of said sleeve therein, said stop means comprising a ring having a perforation to accept said filler cap extension, the interior walls of said filler openings being threaded, and said ring having threaded engagement therein, and means permitting passage of gas between said flange and said stop means, said means comprising at least one groove in the upper face of said flange, said filler cap being perforated to vent the space within said well above said stop.

5. A storage battery cell cover having a filler opening with walls defining a well open to the interior of the cell and presenting an internal shoulder, a valve member having a sleeve which is a tubular portion extending downwardly from said shoulder and a flange resting on said shoulder, means permitting the passage of gas through the said shoulder under said flange, said flange adapted to close said means, a filler cap, said cap and sleeve having means for the engagement and lifting of said sleeve, whereby to permit gas passage, and a stop for limiting the lifting motion of said sleeve, said engagement means comprising a threaded upward extension on said sleeve and a threaded downward extension of said filler cap, said flange having means permitting the passage of gas, and said extension on said filler cap being vented.

6. A storage battery cell cover having a filler opening with walls defining a well open to the interior of the cell and presenting an internal shoulder, a valve member having a sleeve which is a tubular portion extending downwardly from said shoulder and a flange resting on said shoulder, means permitting the passage of gas through the said shoulder under said flange, said flange adapted to close said means, a filler cap, said cap and sleeve having means for the engagement and lifting of said sleeve, whereby to permit gas passage, and a stop for limiting the lifting motion of said sleeve, said engagement means comprising a threaded upward extension on said sleeve and a threaded downward extension of said filler cap, said flange having means permitting the passage of gas, and said extension on said filler cap being vented, said stop means comprising a threaded hollow nipple having threaded engagement with the walls of the said filler opening.

7. In a cell cover a filler opening with walls defining a well having a bottom, a slidable hollow sleeve extending through a perforation in the well bottom and downwardly to a predetermined point, a flange on said sleeve adapted to rest upon said well bottom and act in conjunction therewith as a gas vent valve closing a passageway into said well external to said sleeve, and a vented filler cap means for said filler opening having means for raising said sleeve whereby to open said valve.

8. In a cell cover a filler opening with walls defining a well having a bottom, a slidable hollow sleeve extending through a perforation in the well bottom and downwardly to a predetermined point, a flange on said sleeve adapted to rest upon said well bottom and act in conjunction therewith as a gas vent valve closing a passageway into said well external to said sleeve, and a vented filler cap means for said filler opening having means for raising said sleeve whereby to open said valve, said flange having a gas venting perforation therein adapted to be closed by said well bottom.

9. A storage battery cell cover having a top with a filler opening provided with walls defining a filler well, said well having a bottom which is perforated, providing an inturned shoulder of annular shape, a tubular member reciprocable through the bottom of said well and having an outturned flange at its top adapted to rest on and conform to said shoulder, there being a passageway for gas through the bottom of said well exterior to said tubular member, and through said well exterior to said flange when said flange and shoulder are out of contact, said flange and said shoulder, when the tubular member is actuated by gravity, being adapted to come together to form a valve in closed position preventing escape of gases through said passageway, said tubular member extending downwardly from the bottom of said well, a filler cap for said well having a threaded extension adapted to engage in a threaded portion of said tubular member and raise it, whereby to bring said flange and said shoulder out of contact and whereby to open said passageway, means for preventing the rotation of said tubular member in said filler well, and means threaded into said filler well to prevent the withdrawal of said tubular member upwardly, whereby said tubular member acts to retain said filler cap in place in said filler well, there being a passageway for gases from said filler well to the outer air when said filler cap is in position.

OLIVER O. RIESER.